(12) United States Patent
Srivastava et al.

(10) Patent No.: US 11,648,835 B2
(45) Date of Patent: May 16, 2023

(54) SMART GRILLE SHUTTER IN CONNECTED VEHICLE

(71) Applicant: Toyota Motor Engineering & Manufacturing North America, Inc., Plano, TX (US)

(72) Inventors: Abhishek Srivastava, Ann Arbor, MI (US); David W. Cosgrove, Milford, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 236 days.

(21) Appl. No.: 16/824,087

(22) Filed: Mar. 19, 2020

(65) Prior Publication Data

US 2021/0291640 A1  Sep. 23, 2021

(51) Int. Cl.
*B60K 11/08*  (2006.01)
*G07C 5/08*  (2006.01)

(52) U.S. Cl.
CPC .......... *B60K 11/085* (2013.01); *G07C 5/0816* (2013.01)

(58) Field of Classification Search
CPC ...... B60K 11/085; G07C 5/0816; Y02T 10/88
See application file for complete search history.

(56) References Cited

U.S. PATENT DOCUMENTS

| | | | |
|---|---|---|---|
| 5,732,666 A | 3/1998 | Lee | |
| 6,390,217 B1 | 5/2002 | O'Brien et al. | |
| 6,588,380 B2 | 7/2003 | Ries-Mueller | |
| 7,766,111 B2 * | 8/2010 | Guilfoyle | B60K 11/085 296/180.5 |
| 8,181,475 B2 | 5/2012 | Kanemaru | |
| 8,667,931 B2 | 3/2014 | Kerns | |
| 8,833,498 B2 | 9/2014 | Charnesky et al. | |
| 9,228,472 B2 | 1/2016 | Greiner et al. | |
| 9,291,256 B2 | 3/2016 | Bidner et al. | |
| 9,827,845 B2 | 11/2017 | Miyaji et al. | |
| 9,935,119 B2 | 4/2018 | Tseng et al. | |
| 10,023,024 B2 | 7/2018 | Carlesimo et al. | |
| 11,167,635 B2 * | 11/2021 | Brinkmann | B60S 1/66 |
| 11,208,945 B1 * | 12/2021 | Smith | F02B 29/0406 |
| 2011/0061405 A1 * | 3/2011 | Watanabe | B60K 11/085 62/133 |

(Continued)

FOREIGN PATENT DOCUMENTS

GB  2159866 A  5/2015

*Primary Examiner* — Kurt Philip Liethen
(74) *Attorney, Agent, or Firm* — Snell & Wilmer LLP (57) ABSTRACT

Methods, systems, devices and apparatuses for a engine compartment ventilation system. The engine compartment ventilation system includes a grille cover. The grille cover is configured to cover an engine compartment of the vehicle. The grille cover has one or more grille shutters. The engine compartment ventilation system includes a sensor. The sensor is configured to measure an ambient temperature of an environment surrounding the vehicle. The engine compartment ventilation system includes an electronic control unit. The electronic control unit is coupled to the one or more grille shutters and the sensor. The electronic control unit is configured to control the one or more grille shutters based on the ambient temperature of the environment surrounding the vehicle.

20 Claims, 5 Drawing Sheets

(56) References Cited

U.S. PATENT DOCUMENTS

| | | | |
|---|---|---|---|
| 2012/0097465 A1* | 4/2012 | Leffert | F01P 7/12 180/68.1 |
| 2012/0318592 A1 | 12/2012 | Schmid et al. | |
| 2013/0081888 A1* | 4/2013 | Charnesky | B60K 11/08 180/68.3 |
| 2014/0039765 A1* | 2/2014 | Charnesky | B60K 11/085 701/49 |
| 2017/0321593 A1* | 11/2017 | Wolff | B60K 11/085 |
| 2018/0022210 A1* | 1/2018 | Matsumura | F01P 7/12 123/41.05 |
| 2018/0079405 A1* | 3/2018 | Gaither | B60W 10/22 |
| 2018/0086224 A1* | 3/2018 | King | B60H 1/32281 |
| 2018/0154763 A1* | 6/2018 | Dudar | H04N 7/183 |
| 2019/0107099 A1 | 4/2019 | Strang et al. | |
| 2019/0272687 A1* | 9/2019 | Dudar | F01P 5/043 |

* cited by examiner

SMART GRILLE SHUTTER IN CONNECTED VEHICLE

BACKGROUND

Field

This disclosure relates to a system, method, apparatus and/or device to manage air circulation and/or limit heat loss within the engine compartment of the vehicle.

Description of the Related Art

When a vehicle is parked outside for a long duration, the temperature within the engine compartment may drop and cause the engine of the vehicle to cool down. When the vehicle is started, the engine must first have to warm up to an optimal temperature range for the best fuel economy. In colder climates, when the customer is away from the vehicle and returns to the vehicle to startup, the customer may activate the heating, ventilation and air conditioning (HVAC) unit to warm the temperature within the cabin. This increases the load on the HVAC unit and further draws power or energy away from starting up the engine when the engine has cooled down due the ambient temperature outside of the parked vehicle.

Moreover, when the engine compartment has cooled, the engine may need to be further warmed for a period of time before the vehicle is able to operate more effectively. Thus, the customer may be delayed while waiting for the engine to warm.

Accordingly, there is a need for a system, apparatus and/or method to reduce the maintain the temperature within the engine compartment to reduce the amount of energy used during vehicle startup to increase fuel efficiency.

SUMMARY

In general, one aspect of the subject matter described in this disclosure may be embodied in an engine compartment ventilation system. The engine compartment ventilation system includes a grille cover. The grille cover is configured to cover an engine compartment of the vehicle. The grille cover has one or more grille shutters. The engine compartment ventilation system includes a sensor. The sensor is configured to measure an ambient temperature of an environment surrounding the vehicle. The engine compartment ventilation system includes an electronic control unit. The electronic control unit is coupled to the one or more grille shutters and the sensor. The electronic control unit is configured to control the one or more grille shutters based on the ambient temperature of the environment surrounding the vehicle.

These and other embodiments may optionally include one or more of the following features. The one or more grille shutters may be configured to open and close to control airflow into the engine compartment of the vehicle. The electronic control unit may be configured to determine the ambient temperature of the environment surrounding the vehicle. The electronic control unit may be configured to open the one or more grille shutters when the ambient temperature is greater than a threshold temperature.

The engine compartment ventilation system may include a second sensor. The second sensor may be configured to obtain weather information. The weather information may include a likelihood or an amount of precipitation or a direction or a speed of wind. Other information in the weather information may include a past history of the weather for the current location of the vehicle 102 for the past few days and/or the amount of precipitation on the ground in proximity to the vehicle 102. The electronic control unit may be configured to control the one or more grille shutters further based on the weather information.

The engine compartment ventilation system may include a navigation unit. The navigation unit may be configured to obtain a current location of the vehicle. The electronic control unit may be configured to control the one or more grille shutters based on the current location of the vehicle.

The electronic control unit may be configured to partially open the one or more grille shutters a first amount when the ambient temperature is less than or equal to a first threshold temperature. The electronic control unit may be configured to close the one or more grille shutters when the ambient temperature is greater than the first threshold temperature but less than a second threshold temperature. The electronic control unit may be configured to open the one or more grille shutters a second amount when the ambient temperature is greater than or equal to the second threshold temperature. The first amount may be less than the second amount and the first threshold temperature may be less than the second threshold temperature.

In another aspect of the subject matter may be embodied in an engine compartment ventilation system for a vehicle. The engine compartment ventilation system includes a grille cover. The grille cover is configured to cover an engine compartment of the vehicle. The grille cover has one or more grille shutters. The engine compartment ventilation system has a sensor. The sensor is configured to measure an ambient temperature of an environment surrounding the vehicle. The engine compartment ventilation system includes an electronic control unit. The electronic control unit is coupled to the one or more grille shutters and the sensor. The electronic control unit is configured to open or close the one or more grille shutters based on the ambient temperature of the environment surrounding the vehicle.

In another aspect, the subject matter may be embodied in a method for controlling a temperature within an engine compartment of a vehicle. The method includes measuring an ambient temperature of an environment surrounding the vehicle. The method includes partially opening two or more grille shutters of a grille cover of the vehicle a first amount when the ambient temperature is less than or equal to a first threshold temperature to prevent the two or more grille shutters from freezing to each other. The method includes closing the two or more grille shutters when the ambient temperature is greater than the first threshold temperature but less than a second threshold temperature to maintain the temperature within the engine compartment within an optimal range. The method includes opening the two or more grille shutters a second amount when the ambient temperature is greater than or equal to the second threshold temperature to reduce the temperature within the engine compartment.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for controlling air circulation and limiting heat loss within the engine compartment of the vehicle. The engine compartment ventilation system controls the operation of the one or more grille shutters of the grille cover of the vehicle to control air circulation with engine compartment of the vehicle. The grille cover of the vehicle covers or encloses the engine compartment of the vehicle and operates one or more grille shutters to manage, control, prevent and/or allow air circulation within the engine compartment of the vehicle. When a vehicle is parked outside, the temperature within the engine compartment and/or the temperature of the engine (or "engine temperature") may change based on the ambient temperature of the environment surrounding the vehicle. For example, when the vehicle is parked outside for a long duration the engine temperature may drop and cause the engine to cool down, and thus, when the vehicle is started the engine has to warm up to an optimal temperature range for the best fuel economy.

The engine compartment ventilation system controls the position of the one or more grille shutters to open or close to increase or decrease an amount of air circulation into the engine compartment, respectively, to manage or limit heat loss from the engine compartment of the vehicle. This maintains the temperature within the engine compartment, the temperature of the engine coolant, and/or the engine temperature of the engine.

By managing or limiting heat loss from within the engine compartment of the vehicle, the engine compartment ventilation system decreases the amount of energy necessary to warm the engine to the optimal temperature range during vehicle startup. This increases fuel economy and occupant comfort within the vehicle allowing the driver to start the vehicle quicker and allows energy to be diverted to support the load on the heating, ventilation and air conditioning (HVAC) unit, which reduces the load on the HVAC unit.

Other benefits and advantages include the capability to open the one or more grille shutters when the ambient temperature is very cold. By opening or keeping open the one or more grille shutters open when the ambient temperature is below freezing, the engine compartment ventilation system prevents a grille shutter of the grille cover from freezing with an adjacent grille shutter. Moreover, the engine compartment ventilation system 100 may account for various factors, such as the amount of precipitation, the wind direction, the location of the vehicle and/or surrounding objects that provide shelter to the vehicle when determining whether to open or close the one or more grille shutters to manage air flow into the engine compartment. This prevents precipitation from entering the engine compartment, for example. Additionally, the engine compartment ventilation system may manage other components, such as the front spoiler, which may also provide air circulation to the engine compartment of the vehicle.

Figure 1:
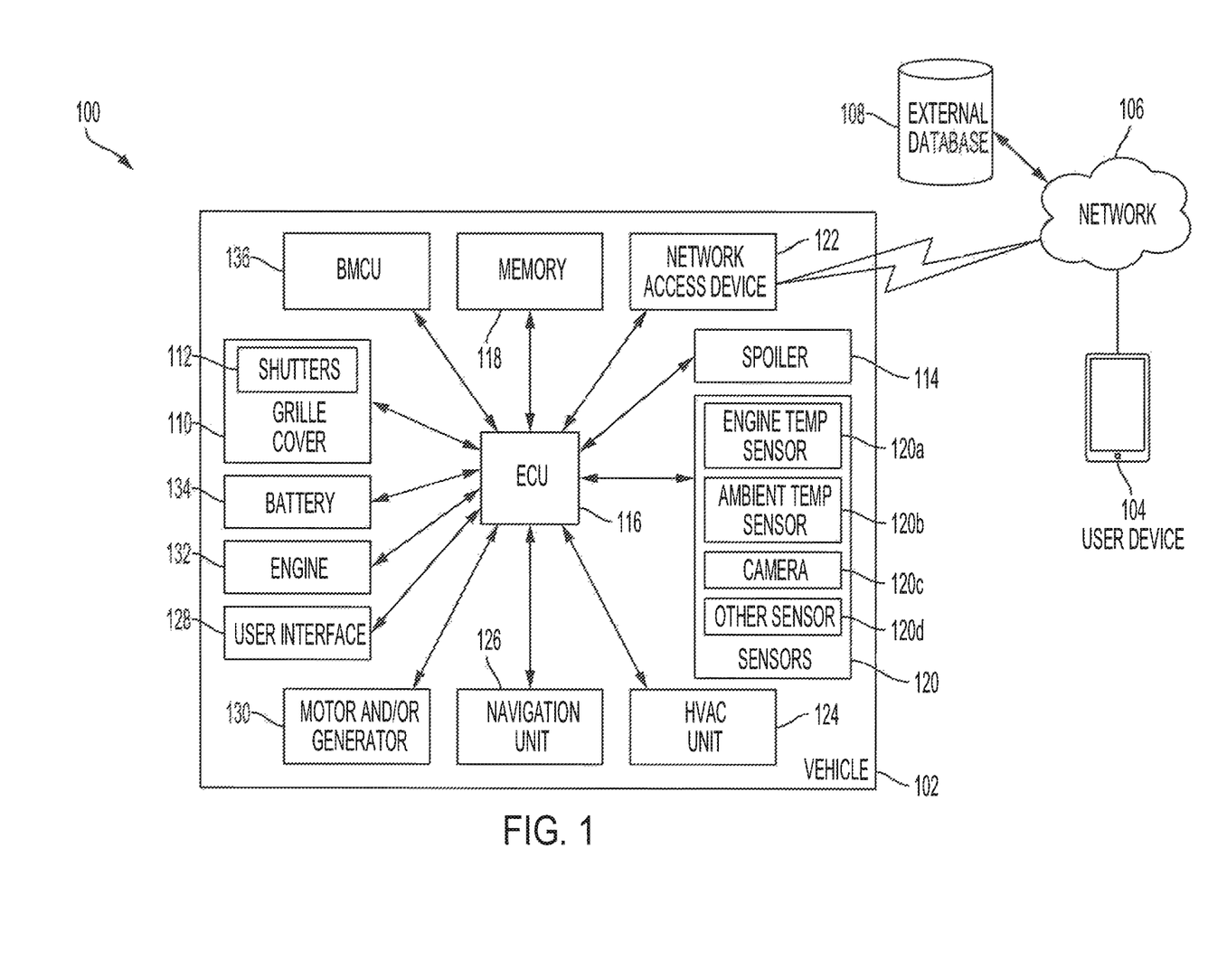
FIG. 1 is a block diagram of an example engine compartment ventilation system according to an aspect of the invention.

FIG. 1 is a block diagram of an engine compartment ventilation system 100. The engine compartment ventilation system 100 may be retro-fitted, coupled to, integrated with, include or be included within a vehicle 102 or may be entirely separate from the vehicle 102. The engine compartment ventilation system 100 may include or be coupled to a user device 104 and/or an external database 108. The user device 104 may be a personal device, a mobile device, such as a smartphone, a tablet other electronic device that may be display notifications, run applications or otherwise interact with the vehicle 102 and via a wireless or a wired connection.

The engine compartment ventilation system 100 may have or use a network 106 to communicate among different components, such as between the vehicle 102, the user device 104 and/or the external database 108. The network 106 may be a Dedicated Short-Range Communication (DSRC) network, a local area network (LAN), a wide area network (WAN), a cellular network, the Internet, or combination thereof, that connects, couples and/or otherwise communicates among the different components of the engine compartment ventilation system 100.

The engine compartment ventilation system 100 may include or be coupled to the external database 108. A database is any collection of pieces of information that is organized for search and retrieval, such as by a computer, and the database may be organized in tables, schemas, queries, reports, or any other data structures. A database may use any number of database management systems. The external database 108 may include a third-party server or website that stores or provides information. The information may include real-time information, periodically updated information, or user-inputted information. A server may be a computer in a network that is used to provide services, such as accessing files or sharing peripherals, to other computers in the network.

The external database 108 may be a map database that includes the locations of various structural features or overhead structures, such as parking structures, covered garage, trees, bridges, overpasses or other overhead structures that may form a shaded or covered area, which may block or provide protection from precipitation, weather or other variables that may affect the ambient temperature or other environmental variables surrounding the vehicle 102. The external database 108 may be a weather database that stores and/or provides weather information including the ambient temperature, weather, amount and/or likelihood of precipitation, wind direction or speed and/or other weather factors that may affect the environment surrounding the vehicle 102.

The engine compartment ventilation system 100 detects or measures the ambient temperature outside the vehicle along with other various parameters, such as the weather condition of the surrounding environment and/or surrounding structures or objects in proximity to the vehicle 102. The engine compartment ventilation system 100 controls the operation of one or more grille shutters 112 of the grille cover 110, which may be positioned at a front of the vehicle 102, and/or other components, such as a spoiler 114 to control the air circulation within the engine compartment of the vehicle 102. By circulating the flow of air within the engine compartment of the vehicle 102, the engine compartment ventilation system 100 may maintain the temperature within the engine compartment at the optimal temperature range, such as between approximately 40° F. and 75° F., so that heat loss is reduced and the engine temperature remains warm and steady to allow for optimal fuel efficiency during vehicle startup.

Various parameters, such as the structures or objects surrounding the vehicle 102, the weather near or in proximity to the vehicle 102, the ambient temperature of the surrounding environment and/or the engine temperature, may present various reasons to adjust the air flow within or out of the engine compartment when the vehicle 102 is off. Thus, the engine compartment ventilation system 100 accounts for these various factors to automatically open, close or otherwise position the one or more grille shutters 112 and/or the spoiler 114. The engine compartment ventilation system 100 may also notify the user when the one or more grille shutters 112 and/or the spoiler 114 is repositioned or otherwise adjusted.

The engine compartment ventilation system 100 may include or be retro-fitted or integrated with the vehicle 102. The engine compartment ventilation system 100 may include an electronic control unit 116, a memory 118, a network access device 122 and/or one or more sensors 120. The engine compartment ventilation system 100 may include or be coupled to one or more components of the vehicle 102, such as the HVAC unit 124, the navigation unit 126 and/or the user interface 128. The engine compartment ventilation system 100 may include one or more other components of the vehicle 102, such as the motor and/or generator 130, the engine 132, the battery 134, and/or the battery management and control unit (BMCU) 136.

A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The engine compartment ventilation system 100 includes or couples to one or more processors, such as the electronic control unit (ECU) 116. The one or more processors, such as the ECU 116, may be implemented as a single processor or as multiple processors. For example, the ECU 116 may be a microprocessor, data processor, microcontroller or other controller, and may be electrically coupled to some or all the other components within the vehicle 102 and/or the engine compartment ventilation system 100. The one or more processors may adjust the amount that each of the one or more grille shutters 112 and/or spoiler 114 are opened, closed or otherwise moved to allow air to circulate within the engine compartment of the vehicle 102. The ECU 116 may be coupled to the memory 118.

The engine compartment ventilation system 100 has a memory 118. The memory 118 may be coupled to the ECU 116 and store instructions that the ECU 116 executes. The memory 118 may include one or more of a Random Access Memory (RAM), Read Only Memory (ROM) or other volatile or non-volatile memory. The memory 118 may be a non-transitory memory or a data storage device, such as a hard disk drive, a solid-state disk drive, a hybrid disk drive, or other appropriate data storage, and may further store machine-readable instructions, which may be loaded and executed by the ECU 116. The memory 118 may store a mapping between a position of each of the one or more grille shutters 112 and/or spoiler 114 and an amount of air circulation desired to enter the engine compartment of the vehicle 102 to keep the temperature within the engine compartment of the vehicle 102 within the optimal temperature range.

The engine compartment ventilation system 100 includes a grille cover 110 covering the engine compartment of the vehicle 102. The grille cover 110 has one or more grille shutters 112. The grille cover 110 covers the engine compartment to enclose the engine 132 of the vehicle 102. The one or more grille shutters 112 provide access for air to flow into the engine compartment of the vehicle 102 so that the temperature within the engine compartment is maintained within the optimal temperature range.

The engine compartment ventilation system may include a spoiler 114. The spoiler 114 may be a front spoiler that also may be positioned, such as opened or closed, to provide access for air to flow into the engine compartment of the vehicle 102. By opening or closing the spoiler 114 and/or the one or more grille shutters 112, the engine compartment ventilation system 100 allows air to circulate into and out of the engine compartment of the vehicle 102 so that the engine temperature may be maintained within the optimal temperature range to allow for the most fuel efficient vehicle startup.

The engine compartment ventilation system 100 may include or be coupled to the HVAC unit 124. The engine compartment ventilation system 100 may maintain the temperature within the engine compartment of the vehicle 102 so that the heat from the engine compartment of the vehicle 102 may be used to reduce the load on the HVAC unit 124 when the vehicle is starting up, such as during cold weather. On a cold day, a driver or other occupant of the vehicle 102 may turn on the HVAC unit 124 upon vehicle startup, which causes an increased load on the HVAC unit 124 and increases use of electrical energy. By maintaining the temperature of the engine compartment within the optimal temperature range, less energy is used to warm the engine 132 and/or excess heat may be provided to the HVAC unit 124 to warm the passenger compartment, which results in greater fuel economy during vehicle startup.

The engine compartment ventilation system 100 may include one or more sensors 120. The one or more sensors 120 may include an engine temperature sensor 120a. The engine temperature sensor 120a measures the temperature of the engine 132, the temperature of the engine coolant and/or the temperature within the engine compartment of the vehicle 102. The one or more sensors 120 may include an ambient temperature sensor 120b. The ambient temperature sensor 120b may measure the temperature of the environment surrounding the vehicle 102. The one or more sensors 120 may include a camera 120c. The camera 120c may capture image data of the surrounding environment, which may be processed or analyzed to determine structures or objects within the surrounding environment of the vehicle 102. The one or more sensors 120 may include other sensors 120d, such as LIDAR, radar, infrared, or other signal to detect one or more objects within a proximity, such as threshold distance of approximately 10-15 feet, of the vehicle 102. These objects may block or prevent wind or precipitation from affecting the vehicle 102. The other sensors 120d may also measure other aspects of the surrounding environment or other aspects of the vehicle 102, such as the speed and/or direction or orientation that the vehicle 102 is facing. The other sensors 120d may include other temperature sensors to measure the temperature within the cabin of the vehicle 102.

The camera 120c may be an external camera that captures image data of the surrounding environment external to the vehicle 102. The image data may capture structures or objects surrounding the vehicle 102, which may be used to identify objects that are blocking precipitation, the wind or other environmental variables that may affect operation of the one or more grille shutters 112 and/or spoiler 114 of the vehicle 102.

The engine compartment ventilation system 100 may have a user interface 128 and/or a network access device 122. The user interface 128 may receive user input that indicates one or more configuration settings, which indicate whether the engine compartment ventilation system 100 automatically opens and/or closes the one or more grille shutters 112 and/or the spoiler 114 and/or notifies the user device 104 to request for instructions to perform one or more operations to the one or more grille shutters 112 and/or spoiler 114.

The user interface 128 may include an input/output device that receives user input from a user interface element, a button, a dial, a microphone, a keyboard, or a touch screen. The user interface 128 may provide an output to an output device, such as a display, a speaker, an audio and/or visual indicator, or a refreshable braille display.

The network access device 122 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 122 may transmit data to and receive data from the different components of the different entities of the engine compartment ventilation system 100, such as the user device 104, and/or the vehicle 102.

The one or more vehicle components may include a navigation unit 126. The navigation unit 126 may be integral to the vehicle 102 or a separate unit coupled to the vehicle 102. The vehicle 102 may include a Global Positioning System (GPS) unit (not shown) for detecting location data including a current location of the vehicle 102 and date/time information instead of the navigation unit 126. In that regard, the ECU 116 may perform the functions of the navigation unit 126 based on data received from the GPS unit. The navigation unit 126 or the ECU 116 may perform navigation functions. Navigation functions may include, for example, route and route set prediction, providing navigation instructions, and receiving user input such as verification of predicted routes and route sets or destinations.

The one or more vehicle components may include a motor and/or generator 130. The motor and/or generator 130 may convert electrical energy into mechanical power, such as torque, and may convert mechanical power into electrical energy. The motor and/or generator 130 may be coupled to the battery 134. The motor and/or generator 130 may convert the energy from the battery 134 into mechanical power, and may provide energy back to the battery 134, for example, via regenerative braking. The vehicle 102 may include one or more additional power generation devices such as the engine 132 or a fuel cell stack (not shown). The engine 132 combusts fuel to provide power instead of and/or in addition to the power supplied by the motor and/or generator 130.

The battery 134 may be coupled to the motor and/or generator 130 and may supply electrical energy to and receive electrical energy from the motor and/or generator 130. The battery 134 may include one or more rechargeable batteries and may supply the power to the engine compartment ventilation system 100 even when the vehicle 102 is off.

The BMCU 136 may be coupled to the battery 134 and may control and manage the charging and discharging of the battery 134. The BMCU 136, for example, may measure, using battery sensors, parameters used to determine the state of charge (SOC) of the battery 134. The BMCU 136 may control the battery 134.

Figure 2:
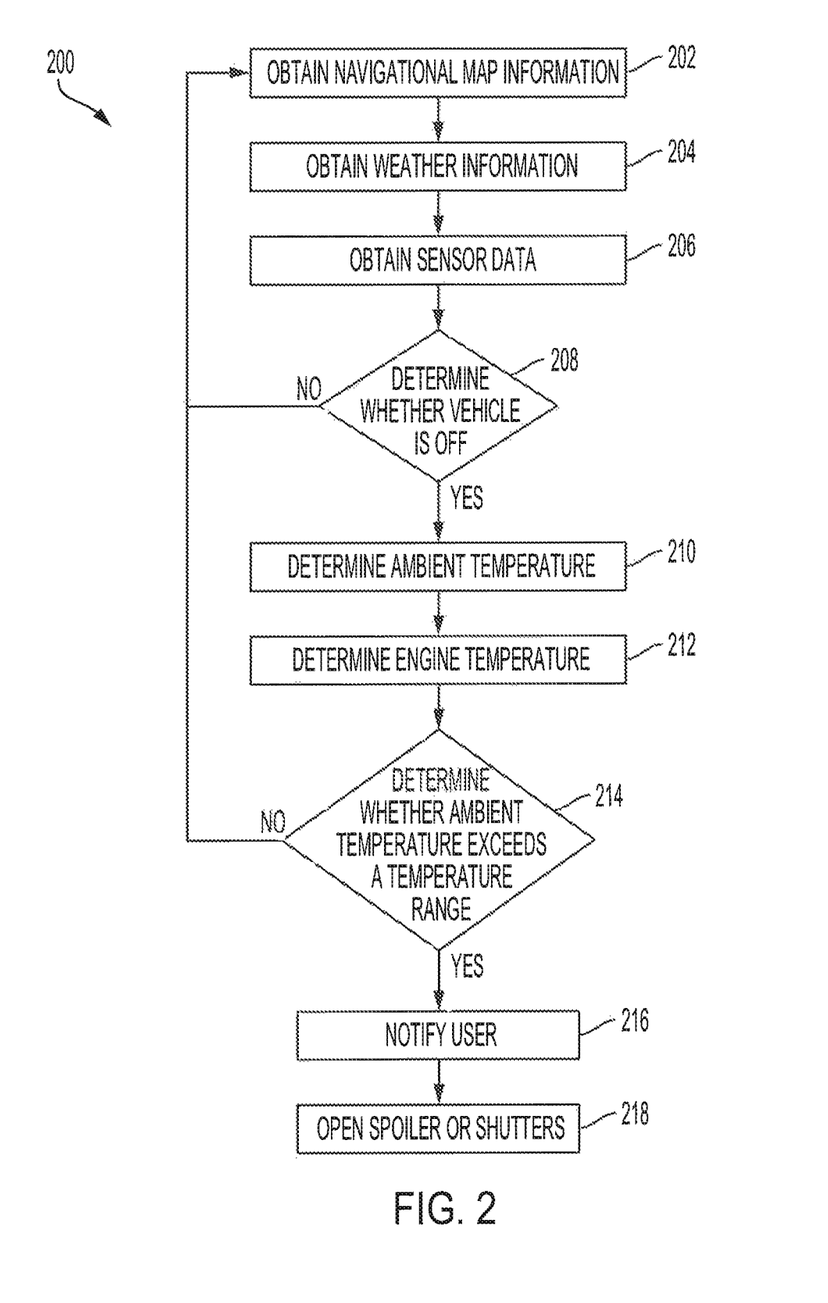
FIG. 2 is a flow diagram of an example process for limiting heat loss within controlling the one or more grille shutters and/or the spoiler of the engine compartment ventilation system of FIG. 1 according to an aspect of the invention.

FIG. 2 is a flow diagram of a process 200 for controlling the one or more grille shutters 112 and/or the spoiler 114. One or more computers or one or more data processing apparatuses, for example, the ECU 116 of the engine compartment ventilation system 100 of FIG. 1, appropriately programmed, may implement the process 200.

The engine compartment ventilation system 100 may obtain navigational map information (202). The navigational map information may include a current location of the vehicle 102 and/or identify the locations of one or more structures or objects near the current location of the vehicle 102, such as a parking structure, an overpass, a bridge or other structure that may block the weather or otherwise affect the temperature within the engine compartment of the vehicle 102. In some implementations, the engine compartment ventilation system 100 may provide the current location of the vehicle 102 to the external database 108 and obtain the locations of the one or more structures or objects near the current location of the vehicle 102. The one or more structures or objects may prevent the weather from affecting the temperature within the engine compartment of the vehicle 102.

The engine compartment ventilation system 100 may obtain weather information (204). The engine compartment ventilation system 100 may provide the current location of the vehicle 102 to an external database 108. The engine compartment ventilation system 100 may receive the weather information in response to providing the current location of the vehicle 102 to the external database 108. The weather information may include a likelihood or amount of precipitation, a wind speed or a wind direction or other weather information related to the current location of the vehicle 102. The engine compartment ventilation system 100 may use one or more sensors 120 to detect the weather information. For example, a humidity sensor may detect an amount of humidity or precipitation at the current location of the vehicle 102 or an anemometer may detect a direction and/or a speed of the wind.

The engine compartment ventilation system 100 may obtain or capture sensor data (206). The engine compartment ventilation system 100 may obtain or capture the sensor data using one or more sensors 120. The sensor data may include image data and/or other sensor data, such as the speed or orientation of the vehicle 102. The engine compartment ventilation system 100 may use the camera 120c to capture the image data. The image data may include one or more surrounding objects, such as another vehicle, a wall, a bridge or other structure that may prevent the weather from affecting the vehicle 102. For example, when the vehicle 102 parked under a bridge, a parking cover or other between two buildings, the wind speed and/or precipitation may not affect operation of the vehicle 102.

The engine compartment ventilation system 100 determines whether the vehicle 102 is off and parked (208). The engine compartment ventilation system may use the sensor data from one or more other sensors 120d, such as an engine sensor, to detect a state of the engine 132 to determine whether the vehicle 102 is off. For example, the engine sensor may detect that the engine 132 is off, and thus, the engine compartment ventilation system 100 may determine that the vehicle 102 is off. The one or more other sensors 120d may include a key sensor. The key sensor may detect whether the key is inserted into the ignition or the key fob is present within the vehicle 102 to determine whether the vehicle 102 is off. For example, the key sensor may detect that the key is not present in the ignition or the key fob is not within the vehicle 102 to determine that the vehicle 102 is off.

In some implementations, the engine compartment ventilation system 100 may use a throttle sensor to detect whether the vehicle 102 is in the parked mode and/or may use a vehicle speed sensor to determine whether the speed of the vehicle 102 is at 0 mph. When the speed is at 0 mph and/or when the vehicle 102 is in the parked mode, the engine compartment ventilation system may determine that the vehicle 102 is off.

When the engine compartment ventilation system 100 determines that the vehicle 102 is not off, the engine compartment ventilation system 100 may continue to monitor and obtain navigational map, weather and/or other sensor information (202). When the engine compartment ventilation system 100 determines that the vehicle 102 is off, the engine compartment ventilation system 100 determines the ambient temperature of the surrounding environment of the vehicle 102 (210).

The engine compartment ventilation system 100 may use an ambient temperature sensor 120b to determine the ambient temperature of the surrounding environment of the vehicle 102 and/or may provide the current location extracted from the navigational map information to an external database 108 to obtain the ambient temperature at the current location of the vehicle 102. In some implementations, the weather information for the current location of the vehicle 102 may include the ambient temperature.

The engine compartment ventilation system 100 may use the ambient temperature as one factor in determining whether to open or close the one or more grille shutters 112 and/or spoiler 114. For example, when the ambient temperature is cool, such as below approximately 75° F., the engine compartment ventilation system 100 may close or leave closed the one or more grille shutters 112 and/or the spoiler 114 to limit heat loss within the engine compartment so that the engine temperature remains within the optimal temperature range. In another example, when the ambient temperature is very hot, such as above approximately 75° F., the engine compartment ventilation system 100 may open the one or more grille shutters 112 and/or the spoiler 114 to allow air to circulate within the engine compartment to keep the engine temperature within the optimal temperature range.

The engine compartment ventilation system 100 may determine the engine temperature (212). The engine compartment ventilation system 100 may use an engine temperature sensor 120a to determine the engine temperature. The engine temperature may be used to determine whether to open or close the one or more grille shutters 112 and/or the spoiler 114. For example, when the engine temperature is excessively hot, such as above a high temperature threshold, the engine compartment ventilation system 100 may open the one or more grille shutters 112 regardless of the ambient temperature or other factors to prevent overheating of the engine 132 upon startup and to cool the temperature more rapidly within the engine compartment.

Figure 3:
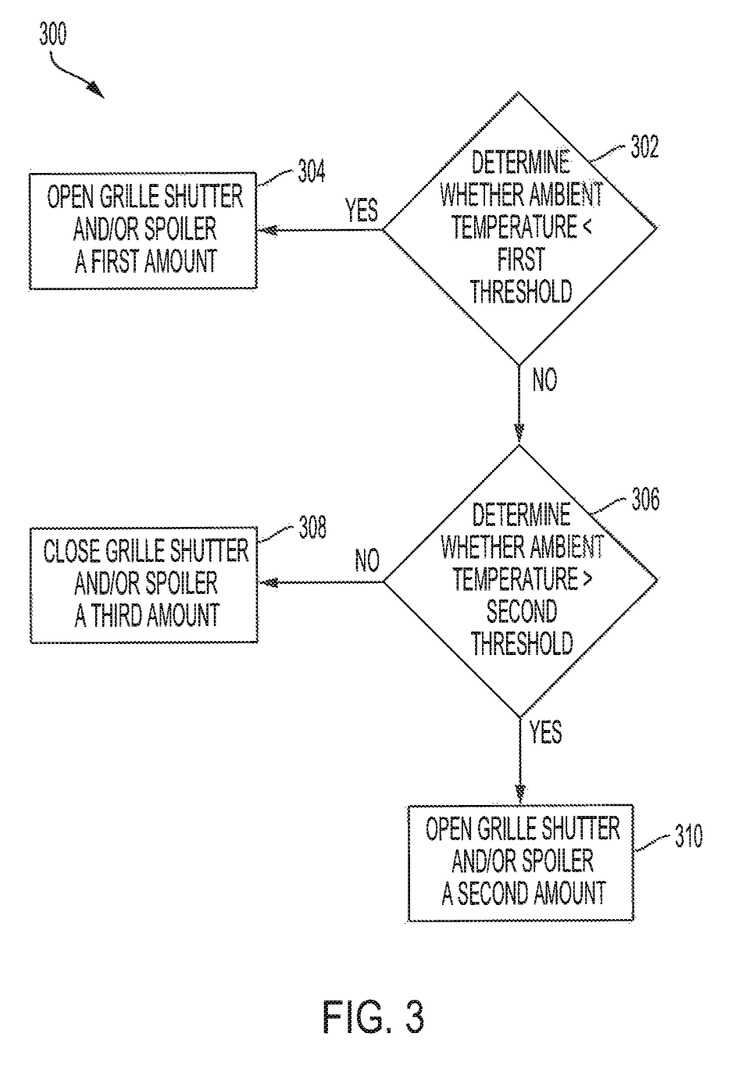
FIG. 3 is a flow diagram of an example process for opening or closing the one or more grille shutters and/or the spoiler of the engine compartment ventilation system of FIG. 1 according to an aspect of the invention.
Figure 4:
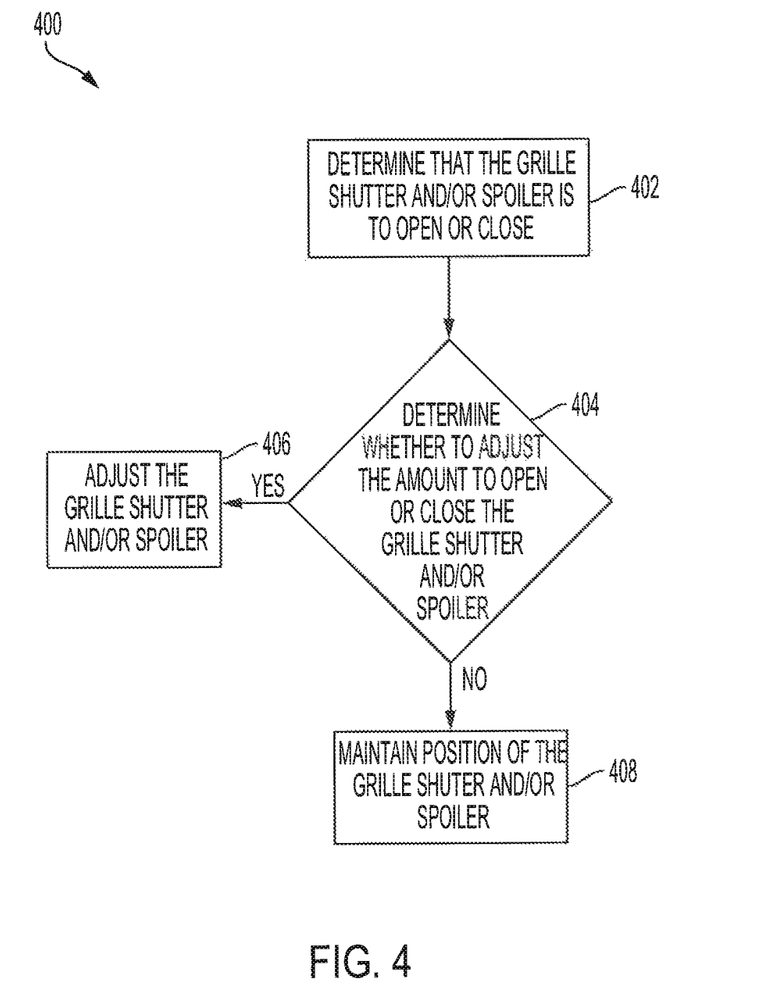
FIG. 4 is a flow diagram for adjusting the position of the one or more grille shutters and/or the spoiler of the engine compartment ventilation system of FIG. 1 according to an aspect of the invention.

The engine compartment ventilation system 100 determines whether the ambient temperature exceeds a temperature range (214). The engine compartment ventilation system 100 compares the ambient temperature to the minimum and maximum temperatures of the temperature range. When the ambient temperature is within the temperature range, the engine compartment ventilation system 100 may keep close or close the one or more grille shutters 112 and/or spoiler 114 to limit heat loss. The engine compartment ventilation system 100 also continues to monitor the various parameters (202). When the ambient temperature does exceed the temperature range, the engine compartment ventilation system 100 may notify the user (216) and/or open the one or more grille shutters 112 and/or the spoiler 114 (218). FIGS. 3-4 further describe the opening or closing of the one or more grille shutters 112 and/or spoiler 114.

The engine compartment ventilation system 100 may send a notification to a user, such as the driver or the occupant of the vehicle 102 (216). The notification may indicate that the engine compartment ventilation system 100 intends to open the one or more grille shutters 112 and/or the spoiler 114 and/or the notification may be a request for confirmation to open the one or more grille shutters 112 and/or spoiler 114.

When the engine compartment ventilation system 100 sends the notification that requires a confirmation, the engine compartment ventilation system 100 may only operate or control the one or more grille shutters 112 and/or spoiler 114 after receipt of the confirmation. Otherwise, when no confirmation is required, the engine compartment ventilation system 100 may automatically open the one or more grille shutters 112 and/or spoiler 114.

The engine compartment ventilation system 100 controls, opens or otherwise operates the one or more grille shutters 112 and/or the spoiler 114 (218). The engine compartment ventilation system 100 may open the one or more grille shutters 112 to circulate air within the engine compartment of the vehicle 102 or close the one or more grille shutters 112 or the spoiler 114 to limit heat loss within the engine compartment of the vehicle 102. Closing the one or more grille shutters 112 and/or the spoiler 114 limits heat loss from the engine compartment of the vehicle 102, whereas, opening the one or more grille shutters 112 and/or the spoiler 114 circulates air within the engine compartment. In some instances, when the ambient temperature is warm, the circulation of the air within the engine compartment may warm the engine 132, especially when the engine 132 has been off for a significant amount of time.

Figure 5A:
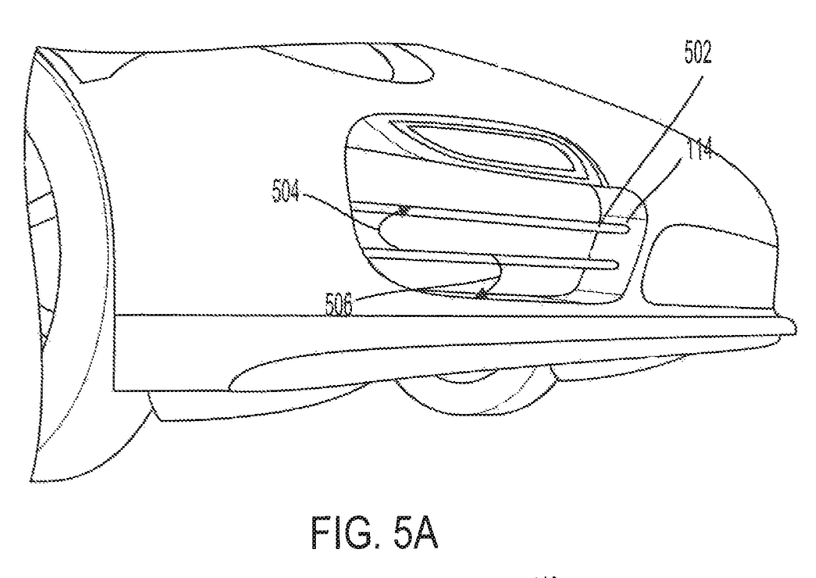
FIG. 5A shows the opening or closing of the spoiler of the engine compartment ventilation system of FIG. 1 according to an aspect of the invention.
Figure 5B:
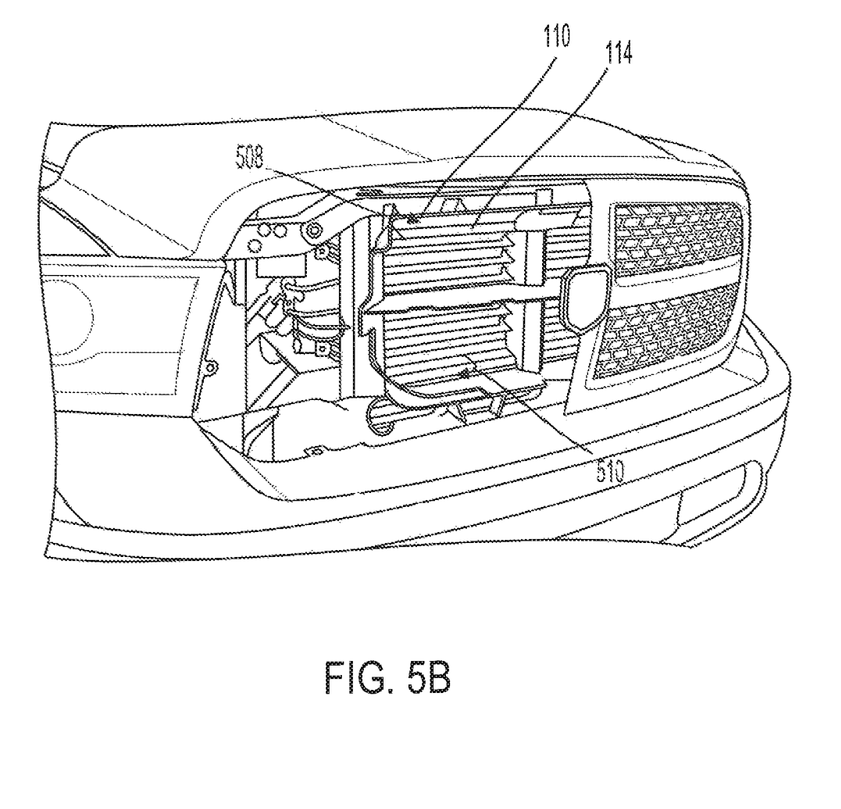
FIG. 5B shows the opening or closing of the one or more grille shutters of the engine compartment ventilation system of FIG. 1 according to an aspect of the invention.

The control of the one or more grille shutters 112 and/or the spoiler 114 may be further based on other factors, such as the engine temperature, surrounding structures, weather information and/or other factors or sensor data. Moreover, the amount that the one or more grille shutters 112 and/or the spoiler 114 is opened or closed may be based on the other factors or sensor data. The opening and/or closing of the one or more grille shutters 112 and/or the spoiler 114 is further described in FIGS. 3-4. In order to open, partially open, close or otherwise position the one or more grille shutters 112 and/or the spoiler 114, the electronic control unit 116 may control an actuator that moves the one or more grille shutters 112 and/or the spoiler 114 in one or more directions and/or amounts, such as tilting the one or more grille shutters 112 vertically or horizontally to close one or more openings or gaps between two or more adjacent grille shutters 112, as shown in FIGS. 5A-5B, for example The engine compartment ventilation system 100 may select one of the one or more grille shutters 112 or the spoiler 114 or both of the one or more grille shutters 112 and the spoiler 114 to open or close based on a current position of the one or more grille shutters 112 and/or the spoiler 114, user settings or user input. For example, the engine compartment ventilation system 100 may select to control the one or more grille shutters 112 to close if the spoiler 114 is already closed when the engine compartment ventilation system 100 needs to further limit heat loss from the engine compartment. In another example, the engine compartment ventilation system 100 may select to control the one or more grille shutters 112 to open if the spoiler 114 is already open when the ambient temperature is below freezing. In another example, a user may indicate via a user setting and/or user input to only control the one or more grille shutters 112 and/or the spoiler 114.

In some implementations, the engine compartment ventilation system 100 may cancel the logic to control the one or more grille shutters 112 and/or the spoiler 114. For example, if the engine temperature is too hot, e.g., above a threshold amount, the engine compartment ventilation system 100 may cancel the logic to control the one or more grille shutters 112 and/or the spoiler 114, such as to leave the one or more grille shutters 112 even when the engine compartment ventilation system 100 would normally close the one or more grille shutters 112.

FIG. 3 is a flow diagram of a process 300 for opening or closing the one or more grille shutters 112 and/or the spoiler 114. One or more computers or one or more data processing apparatuses, for example, the ECU 116 of the engine compartment ventilation system 100 of FIG. 1, appropriately programmed, may implement the process 300.

Once the ambient temperature, navigational map information, the weather information, the image data, the engine temperature and/or other sensor data is obtained or determined, the engine compartment ventilation system 100 determines whether the ambient temperature is less than a first threshold (302). The first threshold may be approximately 32° F. where the one or more grille shutters 112 and/or the spoiler 114 may become frozen or be susceptible to being frozen. This may cause the engine compartment ventilation system 100 to open the one or more grille shutters 112 or the spoiler 114 to prevent the one or more grille shutters 112 or the spoiler 114 from freezing in the closed position.

The engine compartment ventilation system 100 may determine whether the ambient temperature exceeds the various thresholds, such as the first threshold and/or the second threshold, based on the navigational map information, the weather information, the image data, the engine temperature and/or other sensor data. In some implementations, the engine compartment ventilation system 100 may determine or adjust the first and/or second thresholds to account for the various factors, such as the navigational map information, the weather information, the image data, the engine temperature and/or other sensor data.

For example, when the weather information indicates that there is a wind speed above a threshold amount, there is a likelihood of precipitation and/or the orientation of the vehicle 102 exposes the grille cover 110 to the wind and/or precipitation, the engine compartment ventilation system 100 may raise or increase the first threshold to account for wind, precipitation and/or other weather exposure to the vehicle 102 to prevent adjacent grille shutters 112 from freezing to one another. In another example, when the current location of the vehicle 102 or the image data indicates that the vehicle 102 is covered by a structure or an object is blocking the wind or precipitation, such as when the current location of the vehicle 102 is in proximity or within a threshold distance of a location of a covered structure that indicates that the vehicle 102 is within a parking garage or car port, the engine compartment ventilation system 100 may disregard or discount some of the weather information, such as the likelihood of precipitation, when determining the first threshold.

If the engine compartment ventilation system 100 determines that the ambient temperature is less than the first threshold, the engine compartment ventilation system 100 may open or partially open the one or more grille shutters 112 and/or the spoiler 114 (304). The engine compartment ventilation system 100 may use one or more actuators to adjust or angle the spoiler 114 and/or the one or more grille shutters 112 to create an opening between adjacent grille shutters 112 or fins of the spoiler 114 so that the adjacent grille shutters 112 and/or the fins 502 of the spoiler 114 do not freeze with one another. For example, the fins 502 of the spoiler 114 may be angled or moved in the direction 504, as shown in FIG. 5A for example, and/or the one or more grille shutters 112 may move in the direction 508, as shown in FIG. 5B for example, to prevent adjacent fins 502 and/or adjacent grille shutters 112 from freezing.

The engine compartment ventilation system 100 may open or partially open the one or more grille shutters 112 and/or the spoiler 114 a first amount. The first amount may be based on one or more configuration settings, which may be a default setting or user-inputted via the user interface 128. The first amount may be approximately 20%-25% open so that the amount is sufficient to prevent the freezing between adjacent grille shutters 112 and/or fins of the spoiler 114.

If the engine compartment ventilation system 100 determines that the ambient temperature is greater than or equal to the first threshold, the engine compartment ventilation system 100 determines whether the ambient temperature is greater than a second threshold (306). The second threshold may be greater than the first threshold and may be approximately 75° F. Similarly, as to the first threshold, the second threshold account for the navigational map information, the weather information, the image data, the engine temperature and/or other sensor data.

When the engine compartment ventilation system 100 determines that the ambient temperature is greater than or equal to the first threshold and less than or equal to the second threshold, the ambient temperature may be within a range between the first threshold and the second threshold, and so, the engine compartment ventilation system 100 closes the one or more grille shutters 112 and/or the spoiler 114 (308). The engine compartment ventilation system 100 may use one or more actuators to adjust or angle the spoiler 114 and/or the one or more grille shutters 112 to close or partially close the one or more grille shutters 112 and/or the spoiler 114. For example, the engine compartment ventilation system 100 may move the fins 502 in the direction 506 and/or the one or more grille shutters 112 in the direction 510 to limit heat loss within the engine compartment of the vehicle 102.

The engine compartment ventilation system 100 may close or partially close the one or more grille shutters 112 and/or the spoiler 114 a second amount. The second amount may entirely close the one or more grille shutters 112 and/or the fins of the spoiler 114, such that adjacent grille shutters 112 and/or fins 502 are in contact or in near contact with each other. The second amount may be based on one or more configuration settings, which may be a default setting or user-inputted via the user interface 128. The second amount may be approximately 90%-100% or entirely closed to limit heat loss from the engine compartment of the vehicle 102. The second amount may directly correspond or be proportional to the amount of heat loss that is limited from the engine compartment of the vehicle 102.

When the engine compartment ventilation system 100 determines that the ambient temperature is greater than the second threshold, the engine compartment ventilation system 100 opens the one or more grille shutters 112 and/or the spoiler 114 (310). When the ambient temperature is greater than the second threshold, the ambient temperature may be above approximately 75° F., and so, the ambient temperature may be very hot and/or at least hotter than the engine temperature and/or the temperature within the engine compartment. Thus, the engine compartment ventilation system 100 may open the one or more grille shutters 112 and/or the spoiler 114 to circulate air flow into the engine compartment of the vehicle 102 to prevent overheating, for example. The engine compartment ventilation system 100 may open the spoiler 114 by moving the fins 502 in the direction 504 and/or open the one or more grille shutters 112 by moving the one or more grille shutters 112 in the direction 508.

The engine compartment ventilation system 100 may use one or more actuators to adjust or angle the spoiler 114 and/or the one or more grille shutters 112 to open a third amount. The third amount may be based on one or more configuration settings, which may be a default setting or user-inputted via the user interface 128. The third amount may be greater than the first amount, such as being between 90%-100% or entirely open.

FIG. 4 is a flow diagram of a process 400 for adjusting an amount that the one or more grille shutters 112 and/or the spoiler 114 are opened or closed. One or more computers or one or more data processing apparatuses, for example, the ECU 116 of the engine compartment ventilation system 100 of FIG. 1, appropriately programmed, may implement the process 400.

Once the various factors are collected, the engine compartment ventilation system 100 determines that the one or more grille shutters 112 and/or the spoiler 114 is to be opened or closed and opens or closes the one or more grille shutters 112 and/or the spoiler 114, as described above (402). The various factors may include the ambient temperature, the engine temperature, the weather information, the navigational map information including the current location of the vehicle 102 and/or the locations of structures in proximity to the current location of the vehicle 102. Other factors may include the orientation of the vehicle 102 relative to the wind direction and/or the precipitation.

Once the one or more grille shutters 112 and/or the spoiler 114 have been positioned, the engine compartment ventilation system 100 may determine whether to adjust the amount to open or close the one or more grille shutters 112 and/or the spoiler 114 from a current position to another position (404). The engine compartment ventilation system 100 may determine whether to adjust the amount to open or close the one or more grille shutters 112 and/or the spoiler 114 based on a change in one or more of the various factors, as described above, over a period of time. When the change in the one or more of the various factors is greater than a threshold amount, such as approximately 5% from the original measurement, the engine compartment ventilation system 100 may proceed with making an adjustment to the amount that the one or more grille shutters 112 and/or the spoiler 114 is opened or closed. The threshold amount may different for the various factors.

For example, when the ambient temperature changes between the various thresholds, as described in FIG. 3 for example, the engine compartment ventilation system 100 may change the position of the one or more grille shutters 112 and/or the spoiler 114, accordingly. In another example, when the weather information indicates that the likelihood or amount of precipitation has increased or the amount or speed of the wind has increased, the engine compartment ventilation system 100 may increase the amount that the one or more grille shutters 112 and/or the spoiler 114 open when the engine compartment ventilation system 100 is opening to the one or more grille shutters 112 and/or the spoiler 114 to prevent freezing.

When the engine compartment ventilation system 100 determines to adjust the amount to open or close the one or more grille shutters 112 and/or the spoiler 114, the engine compartment ventilation system 100 adjusts the one or more grille shutters 112 and/or the spoiler 114 based on the magnitude of the change (406). The amount that the engine compartment ventilation system 100 changes the position of the one or more grille shutters 112 and/or the spoiler 114 may be directly proportional to the magnitude of the change. For example, as the magnitude of the change increases, the amount that the engine compartment ventilation system 100 changes the position increases, and as the magnitude of the change decreases, the amount that the engine compartment ventilation system 100 changes the position decreases.

When the engine compartment ventilation system 100 determines not to adjust the amount to open or close the one or more grille shutters 112 and/or the spoiler, the engine compartment ventilation system 100 keeps the one or more grille shutters 112 and/or the spoiler 114 at the current position (408). The engine compartment ventilation system 100 continues to monitor the various factors to determine whether an adjustment is needed.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An engine compartment ventilation system for a vehicle having an engine, comprising:
   a grille cover configured to cover an engine compartment of the vehicle and having one or more grille shutters;
   a first sensor configured to measure an ambient temperature of an environment surrounding the vehicle;
   a second sensor configured to detect a state of the engine; and
   an electronic control unit coupled to the one or more grille shutters, the first sensor, and the second sensor, the electronic control unit configured to:

control the one or more grille shutters based on the ambient temperature of the environment surrounding the vehicle being above or below a first threshold and the state of the engine; and adjust the first threshold based on at least one of navigational map information, weather information, image data, or an engine temperature, such that some of the weather information is disregarded when determining the first threshold when a current location of the vehicle based on the navigational map information or the image data indicates that the vehicle is covered by a structure or an object is blocking the weather.

2. The engine compartment ventilation system of claim 1, wherein the one or more grille shutters are configured to open and close to control airflow into the engine compartment of the vehicle and the electronic control unit is configured to control the one or more grille shutters based on the state of the engine when the state of the engine is off.

3. The engine compartment ventilation system of claim 2, wherein the electronic control unit is configured to:
determine the ambient temperature of the environment surrounding the vehicle.

4. The engine compartment ventilation system of claim 2, wherein to control the one or more grille shutters the electronic control unit is configured to:
open the one or more grille shutters when the ambient temperature is greater than a threshold temperature.

5. The engine compartment ventilation system of claim 1, further comprising:
a third sensor configured to obtain weather information including a likelihood or an amount of precipitation or a direction or a speed of wind;
wherein the electronic control unit is configured to control the one or more grille shutters further based on the weather information.

6. The engine compartment ventilation system of claim 1, further comprising:
a third sensor configured to detect an orientation of the vehicle;
wherein the electronic control unit is configured to control the one or more grille shutters further based on the orientation of the vehicle.

7. The engine compartment ventilation system of claim 1, further comprising:
a navigation unit configured to obtain a current location of the vehicle;
wherein the electronic control unit is configured to control the one or more grille shutters further based on the current location of the vehicle.

8. The engine compartment ventilation system of claim 1, wherein to control the one or more grille shutters based on the ambient temperature of the environment surrounding the vehicle, the electronic control unit is configured to:
partially open the one or more grille shutters a first amount when the ambient temperature is less than or equal to a first threshold temperature;
close the one or more grille shutters when the ambient temperature is greater than the first threshold temperature but less than a second threshold temperature; and
open the one or more grille shutters a second amount when the ambient temperature is greater than or equal to the second threshold temperature.

9. The engine compartment ventilation system of claim 8, wherein the first amount is less than the second amount and the first threshold temperature is less than the second threshold temperature.

10. An engine compartment ventilation system for a vehicle having an engine, comprising:
a grille cover configured to cover an engine compartment of the vehicle and having one or more grille shutters;
a first sensor configured to measure an ambient temperature of an environment surrounding the vehicle;
a second sensor configured to detect a state of the engine; and
an electronic control unit coupled to the one or more grille shutters, the first sensor, and the second sensor, and configured to open or close the one or more grille shutters based on the ambient temperature of the environment surrounding the vehicle being above or below a first threshold and the state of the engine, and adjust the first threshold based on at least one of navigational map information, weather information, image data, or an engine temperature, such that some of the weather information is disregarded when determining the first threshold when a current location of the vehicle based on the navigational map information or the image data indicates that the vehicle is covered by a structure or an object is blocking the weather.

11. The engine compartment ventilation system of claim 10, wherein to open or close the one or more grille shutters based on the ambient temperature of the environment surrounding the vehicle the electronic control unit is configured to:
partially open the one or more grille shutters a first amount when the ambient temperature is less than or equal to a first threshold temperature;
close the one or more grille shutters when the ambient temperature is greater than the first threshold temperature but less than a second threshold temperature; and
open the one or more grille shutters a second amount when the ambient temperature is greater than or equal to the second threshold temperature.

12. The engine compartment ventilation system of claim 11, wherein the first amount is less than the second amount and the first threshold temperature is less than the second threshold temperature.

13. The engine compartment ventilation system of claim 11, wherein to partially open the one or more grille shutters the first amount when the ambient temperature is less than or equal to the first threshold temperature prevents the one or more grille shutters from freezing in a closed position due to the ambient temperature being less than or equal to the first threshold temperature.

14. The engine compartment ventilation system of claim 10, further comprising:
a third sensor configured to obtain weather information including a likelihood or an amount of precipitation or a direction or a speed of wind; and
a fourth sensor configured to detect an orientation of the vehicle;
wherein the electronic control unit is configured to open or close the one or more grille shutters further based on the orientation of the vehicle and the weather information.

15. The engine compartment ventilation system of claim 10, further comprising:
a navigation unit configured to obtain a current location of the vehicle;
wherein the electronic control unit is configured to open or close the one or more grille shutters further based on the current location of the vehicle.

16. A method for controlling a temperature within an engine compartment of a vehicle having an engine, comprising:
- measuring an ambient temperature of an environment surrounding the vehicle;
- detecting a state of the engine;
- partially opening two or more grille shutters of a grille cover of the vehicle a first amount when the ambient temperature is less than or equal to a first threshold temperature to prevent the two or more grille shutters from freezing to each other;
- closing the two or more grille shutters when the ambient temperature is greater than the first threshold temperature but less than a second threshold temperature and the state of the engine is off to maintain the temperature within the engine compartment within an optimal range;
- opening the two or more grille shutters a second amount when the ambient temperature is greater than or equal to the second threshold temperature to reduce the temperature within the engine compartment; and
- adjusting the first threshold temperature based on at least one of navigational map information, weather information, image data, or an engine temperature, such that some of the weather information is disregarded when determining the first threshold when a current location of the vehicle based on the navigational map information or the image data indicates that the vehicle is covered by a structure or an object is blocking the weather.

17. The method of claim 16, further comprising:
providing an indication that includes a position of the two or more grille shutters when the two or more grille shutters changes position.

18. The method of claim 16, further comprising:
obtaining or determining weather information including a likelihood of precipitation or a direction or a speed of wind; and
closing the two or more grille shutters based on the weather information.

19. The method of claim 16, further comprising:
measuring an engine temperature of the engine; and
opening the two or more grille shutters regardless of the ambient temperature when the engine temperature is greater than or equal to a fourth threshold temperature.

20. The method of claim 16, further comprising:
controlling a front spoiler that closes off the engine compartment of the vehicle based on the ambient temperature.

\* \* \* \* \*